United States Patent
Wang

(10) Patent No.: US 11,088,817 B2
(45) Date of Patent: Aug. 10, 2021

(54) DATA TRANSMISSION METHOD, DATA TRANSMISSION DEVICE, AND COMPUTER READABLE STORAGE MEDIUM

(71) Applicant: HKC Corporation Limited, Guangdong (CN)

(72) Inventor: Mingliang Wang, Guangdong (CN)

(73) Assignee: HKC Corporation Limited, Shenzhen (CN)

( * ) Notice: Subject to any disclaimer, the term of this patent is extended or adjusted under 35 U.S.C. 154(b) by 0 days.

(21) Appl. No.: 17/037,787

(22) Filed: Sep. 30, 2020

(65) Prior Publication Data
US 2021/0014038 A1 Jan. 14, 2021

Related U.S. Application Data

(63) Continuation of application No. PCT/CN2019/071376, filed on Jan. 11, 2019.

(30) Foreign Application Priority Data

Dec. 19, 2018 (CN) .......................... 201811559901.9

(51) Int. Cl.
| | | |
|---|---|---|
| H03D 1/00 | (2006.01) | |
| H04L 27/06 | (2006.01) | |
| H04L 7/00 | (2006.01) | |
| H04L 7/08 | (2006.01) | |

(52) U.S. Cl.
CPC .......... *H04L 7/0091* (2013.01); *H04L 7/0037* (2013.01); *H04L 7/08* (2013.01)

(58) Field of Classification Search
CPC ....... H04L 7/0091; H04L 7/0037; H04L 7/08; H04L 7/033; H03M 5/12; H04N 7/035; G11B 20/1403

USPC .......................... 375/340, 333, 361, 360, 282
See application file for complete search history.

(56) References Cited

U.S. PATENT DOCUMENTS

| | | | |
|---|---|---|---|
| 5,652,533 | A | 7/1997 | Wong et al. |
| 7,242,658 | B2* | 7/2007 | Hwang .............. G11B 20/1403 369/59.19 |
| 9,077,328 | B1* | 7/2015 | Valliappan .............. H04L 7/033 |
| 2005/0155085 | A1* | 7/2005 | Thaly ..................... H04N 7/035 725/136 |
| 2010/0045492 | A1* | 2/2010 | Chang .................... H03M 5/12 341/70 |

(Continued)

FOREIGN PATENT DOCUMENTS

| | | |
|---|---|---|
| CN | 101563938 A | 10/2009 |
| CN | 101640525 A | 2/2010 |

(Continued)

OTHER PUBLICATIONS

1st Office Action of counterpart Chinese Patent Application No. 201811559901.9 dated Apr. 22, 2020.

(Continued)

*Primary Examiner* — Phuong Phu

(57) ABSTRACT

The present application discloses a data transmission method, a data transmission device, and a computer readable storage medium. The data transmission method includes: determining a logic level of the data signal according to detection potential of each sampling point in the data signal, and regenerating the data signal according to the logic level and a preset amplitude.

14 Claims, 7 Drawing Sheets

(56) References Cited

U.S. PATENT DOCUMENTS

2015/0303808 A1   10/2015   Ryotaro et al.

FOREIGN PATENT DOCUMENTS

| CN | 103634263 A | 3/2014 |
| CN | 105551412 A | 5/2016 |
| CN | 106534015 A | 3/2017 |
| CN | 106998215 A | 8/2017 |
| CN | 108414822 A | 8/2018 |

OTHER PUBLICATIONS

International Search Report of PCT Patent Application No. PCT/CN2019/071376 dated Sep. 11, 2019.

\* cited by examiner

DATA TRANSMISSION METHOD, DATA TRANSMISSION DEVICE, AND COMPUTER READABLE STORAGE MEDIUM

CROSS REFERENCE TO RELATED APPLICATIONS

This application is a continuation application of the international application No. PCT/CN2019/071376, filed on Jan. 11, 2019, which claims the benefit of Chinese Patent Application No. 201811559901.9, filed on Dec. 19, 2018, and entitled "Data Transmission Method, Data Transmission Device, And Computer Readable Storage Medium", which is incorporated herein by reference in its entirety.

FIELD

The present application relates to the field of communication technology, and in particular, to a data transmission method, a data transmission device, and a computer readable storage medium.

BACKGROUND

With an increasing size and resolution of liquid crystal display televisions, more and more data need to be transmitted. As a high-speed transmission protocol, differential signal is widely used. In a process of data transmission with differential signal, a data signal is accompanied by a clock signal, and the data signal is relatively stable when the clock signal rises or falls. At this time, a receiver obtains target data in the data signal.

However, in the actual situation, due to the inconsistency of characteristic impedance of transmission routing, a signal will encounter reflection phenomenon in transmission, and the reflected signal will be superimposed with the initial signal, resulting in uneven waveform of the actual signal. During the transmission of differential signal, both the data signal and the clock signal are affected by the reflection, and there is no correlation between the affections to the data signal and the clock signal. Therefore, when acquiring data in the data signal according to the clock signal, it is prone to cause that error data is obtained.

SUMMARY

It is one main object of the present application to provide a data transmission method, a data transmission device, and a computer readable storage medium, aiming to solve the problem of that, the data signal and the clock signal are both affected by the reflection during differential signal transmission, and affections to the data signal and the clock signal are not related, so that it is prone to cause obtaining error data when acquiring data from the data signal according to the clock signal.

In order to realize the above aim, the present application provides a data transmission method including: obtaining a detection potential at each sampling point in the data signal within a time interval when the data signal is detected, wherein the time interval is half of a data period of the data signal; determining a logic level of the data signal during the time interval according to each detection potential; and regenerating the data signal according to the logic level and a preset amplitude.

In some embodiments, the operation of determining a logic level of the data signal during the time interval according to each detection potentials includes: obtaining a number of high potentials higher than a preset potential and a number of low potentials lower than or equal to the preset potential in the detection potentials; when the number of the high potentials is greater than the number of the low potentials, determining that the logic level of the data signal is a high level during the time interval; when the number of the high potentials is less than the number of the low potentials, determining that the logic level of the data signal is a low level during the time interval.

In some embodiments, before the operation of obtaining a detection potential at each sampling point in a data signal within a time interval, the data transmission method includes: acquiring a clock signal corresponding to the data signal when the data signal is detected; determining the data period according to a clock period of the clock signal.

In some embodiments, the operation of determining the data period according to a clock period of the clock signal includes: taking the clock period of the clock signal as the data period.

In some embodiments, after the operation of determining the data period according to a clock period of the clock signal, the data transmission method includes: monitoring a zero-volt time point at which a potential of the clock signal is zero volt in real time; when the zero-volt time point delays a preset time interval, taking a current time point as a starting time point, and obtaining the detection potential of the data signal at each detection time point in the data period.

In some embodiments, a data driver for data transmission includes a delay member, and the preset time interval is obtained through the delay member.

In some embodiments, device involved in the data transmission method includes a potential detecting member, and the operation of monitoring a zero-volt time point at which a potential of the clock signal is zero volt in real time includes: detecting the potential of the clock signal detected by the potential detecting member in real time; a time point at which the potential detected is zero volt by the potential detecting member is the zero-volt time point of the clock signal.

In some embodiments, before the operation of determining the data period according to a clock period of the clock signal, the data transmission method further includes: obtaining a clock period of the clock signal.

In some embodiments, the operation of obtaining a clock period of the clock signal includes: obtaining a frequency of the clock signal, and obtaining the clock period of the clock signal according to the frequency; or obtaining zero-volt time points of the clock signal, and obtaining the clock period of the clock signal according to a time interval between two adjacent zero-volt time points.

In some embodiments, after the operation of regenerating the data signal according to the logic level and a preset amplitude, the data transmission method further includes: obtaining data of the regenerated data signal according to the clock signal.

In some embodiments, the data transmission method also includes: obtaining a rising edge and a falling edge of the clock signal; determining a time point corresponding to the rising edge and a time point corresponding to the falling edge in the data signal; and capturing data corresponding to the time points in the data signal.

In some embodiments, the operation of obtaining a detection potential at each sampling point in a data signal within a time interval includes: obtaining the detection potential of each sampling point detected by a potential judging member.

In some embodiments, the preset amplitude is greater than or equal to 0.5 volts.

In addition, in order to realize the above aim, the present application provides a data transmission device, including: a memory, a processor, and data transmission program stored in the memory and executable by the processor, the data transmission program implementing the following operations when executed by the processor: obtaining a detection potential at each sampling point in a data signal within a data period when detecting a data signal; determining a logic level of the data signal during the data period according to each detection potential; and regenerating the data signal according to the logic level and a preset amplitude.

In addition, in order to realize the above aim, the present application provides a computer readable storage medium, wherein the computer readable storage medium stores a data transmission program, and the data transmission program implements the following operations when executed by a processor: obtaining a detection potential at each sampling point in a data signal within a data period when detecting a data signal; determining a logic level of the data signal during the data period according to each detection potential; and regenerating the data signal according to the logic level and a preset amplitude.

Embodiments of the present application provide a data transmission method, a data transmission device, and a computer readable storage medium. When data signal transmission is detected, detection potential of the data signal at each sampling point in a half data period is detected, and logic levels of the data signal in the half data period are obtained according to the detection potentials. And then, a data signal generation circuit regenerates the standard data signal according to the logic levels obtained. The regenerated standard data signal can meet the data signal processing requirements of the internal processing circuit in the data driver, and can effectively capture data to avoid data obtaining errors.

The realizing of the aim, functional characteristics, advantages of the present application are further described in detail with reference to the accompanying drawings and the embodiments.

DETAILED DESCRIPTION

It is to be understood that, the specific embodiments described here shall only be used to interpret this application, and shall not be intended to limit this application.

Figure 1:
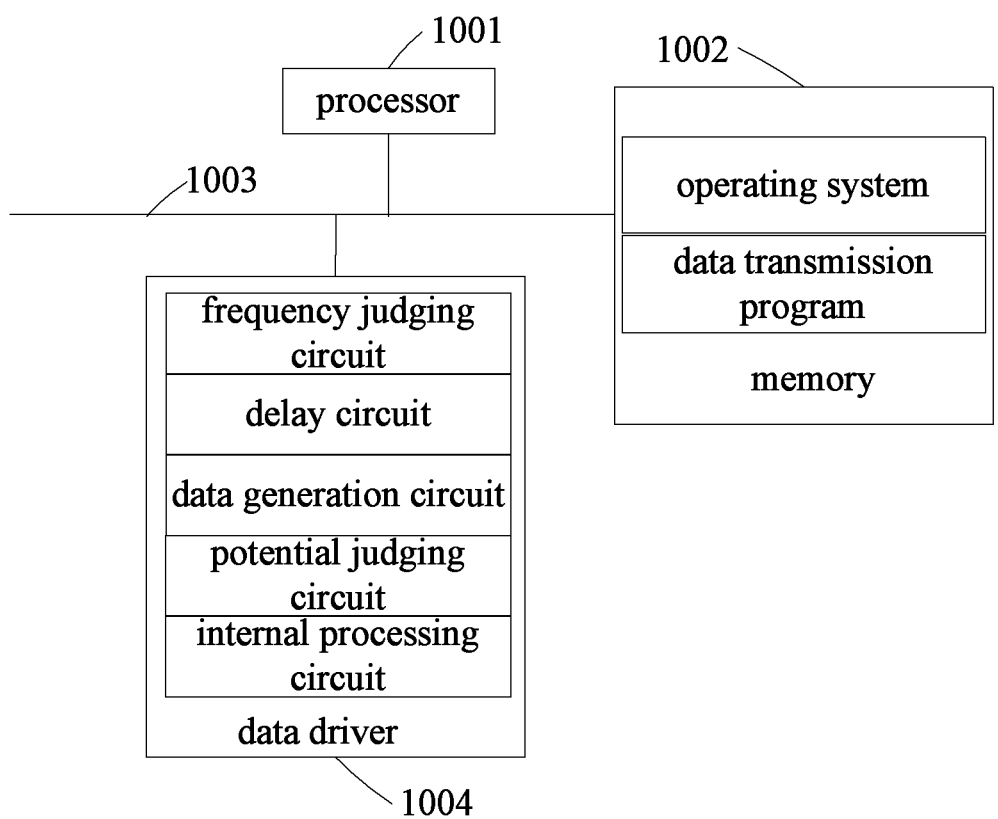
FIG. 1 is a structure diagram of a terminal in a hardware operating environment involved in an embodiment of the present application.

As shown in FIG. 1, FIG. 1 is a structure diagram of a terminal in a hardware operating environment involved in an embodiment of the present application.

The terminal in an embodiment of the present application may be a data extraction device of data signal, a television, or a computer, etc.

As shown in FIG. 1, the terminal may include: a processor 1001, such as the central processing unit/processor (CPU), a memory 1002, a communication bus 1003, and a data driver 1004. Wherein, the communication bus 1003 is set to implement the connection communication between members of the terminal. The memory 1002 may be high-speed random access memory or non-volatile memory such as disk memory. The memory 1002 may optionally be a storage device independent of the processor 1001 described above. The data driver 1004 processes data signal, and the data driver may include at least one of a frequency judging circuit, a potential judging circuit, a delay circuit, a data signal generation circuit and a internal processing circuit.

The technical personnel in the field may understand that the structure of the terminal shown in FIG. 1 does not constitute a limitation for the terminals in embodiments of the application, and the terminals may include more or less parts than those shown in the diagram, or the terminals may combine some parts, or may have different part arrangements.

As shown in FIG. 1, the memory 1002 as a computer storage medium may include a data transmission program.

In the server shown in FIG. 1, the processor 1001 can call the data transmission program stored in the memory 1002 and perform the following operations:

obtaining a detection potential at each sampling point in a data signal within a time interval when the data signal is detected, wherein the time interval is half of a data period of the data signal;

determining a logic level of the data signal during the time interval according to each detection potential; and regenerating the data signal according to the logic level and a preset amplitude.

Optionally, the processor 1001 can call the data transmission program stored in the memory 1002 and perform the following operations:

obtaining the number of high potentials higher than the preset potential and the number of low potentials lower than or equal to the preset potential in the detection potentials;

when the number of high potentials is greater than the number of low potentials, the logic level of the data signal is high level during the time interval;

when the number of high potentials is less than the number of low potentials, the logic level of the data signal is low level during the time interval.

Optionally, the processor 1001 can call the data transmission program stored in the memory 1002 and perform the following operations:

acquiring a clock signal corresponding to the data signal when the data signal is detected;

determining the data period according to a clock period of the clock signal.

Optionally, the processor 1001 can call the data transmission program stored in the memory 1002 and perform the following operations:

monitoring a zero-volt time point at which the potential of the clock signal is zero volts in real time;

taking a current time point as a starting time point, and obtaining the detection potential of the data signal at each detection time point in the data period, when the zero-volt time point delays a preset time interval.

Optionally, the processor 1001 can call the data transmission program stored in the memory 1002 and perform the following operations:

obtaining a clock period of the clock signal.

Optionally, the processor 1001 can call the data transmission program stored in the memory 1002 and perform the following operations:

obtaining a frequency of the clock signal, and obtaining the clock period of the clock signal according to the frequency; or obtaining zero-volt time point of the clock signal, and obtaining the clock period of the clock signal according to a time interval between two adjacent zero-volt time points.

Optionally, the processor 1001 can call the data transmission program stored in the memory 1002 and perform the following operations:

obtaining the data of the regenerated data signal according to the clock signal.

Optionally, the processor 1001 can call the data transmission program stored in the memory 1002 and perform the following operations:

obtaining a rising edge and a falling edge of the clock signal;

determining a time point corresponding to the rising edge and a time point corresponding to the falling edge in the data signal; and capturing data corresponding to the time points in the data signal.

Figure 2:
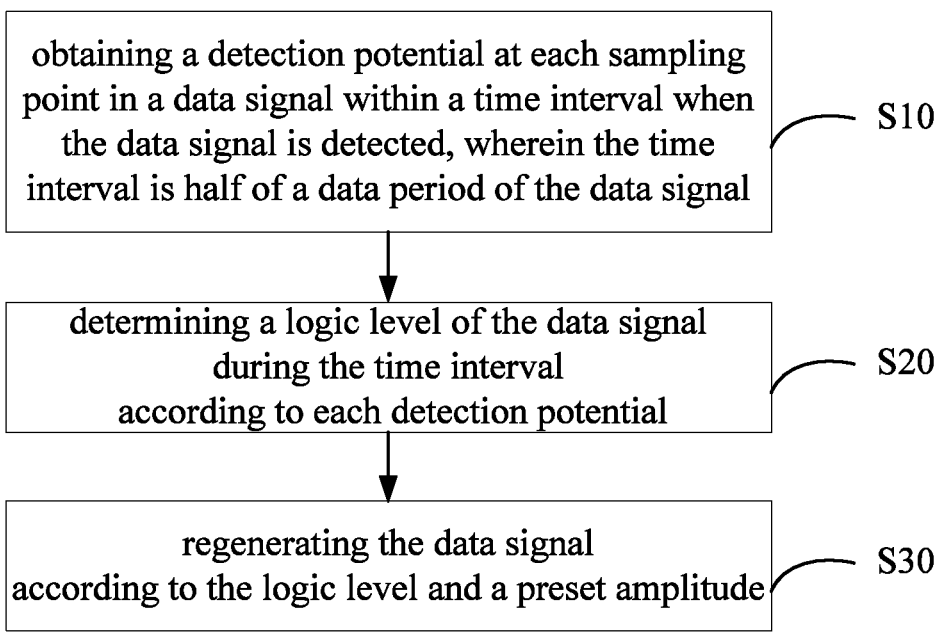
FIG. 2 is a flowchart of a data transmission method in an embodiment of the present application.

Referring to FIG. 2, in an embodiment of the data transmission method, includes:

step S10, obtaining a detection potential at each sampling point in a data signal within a time interval when the data signal is detected, wherein the time interval is half of a data period of the data signal;

step S20, determining a logic level of the data signal during the time interval according to each detection potential; and step S30, regenerating the data signal according to the logic level and a preset amplitude.

In today's life, with the development of communication technology, signal transmission method is adopted to data transmission more and more. Taking the technical field of digital television as an example, with an increasing size and resolution of liquid crystal display televisions, more and more data need to be transmitted. As a high-speed transmission protocol, differential signal is widely used. However, in the actual process of transmission, due to the inconsistency of characteristic impedance of transmission routing, a signal will encounter reflection phenomenon in transmission process, and the reflected signal will be superimposed with the initial signal, resulting in uneven waveform of the actual signal. If extracting data in the data signal according to the clock signal relating to the data signal directly at this time, it is easy to cause data identification errors.

Figure 3:
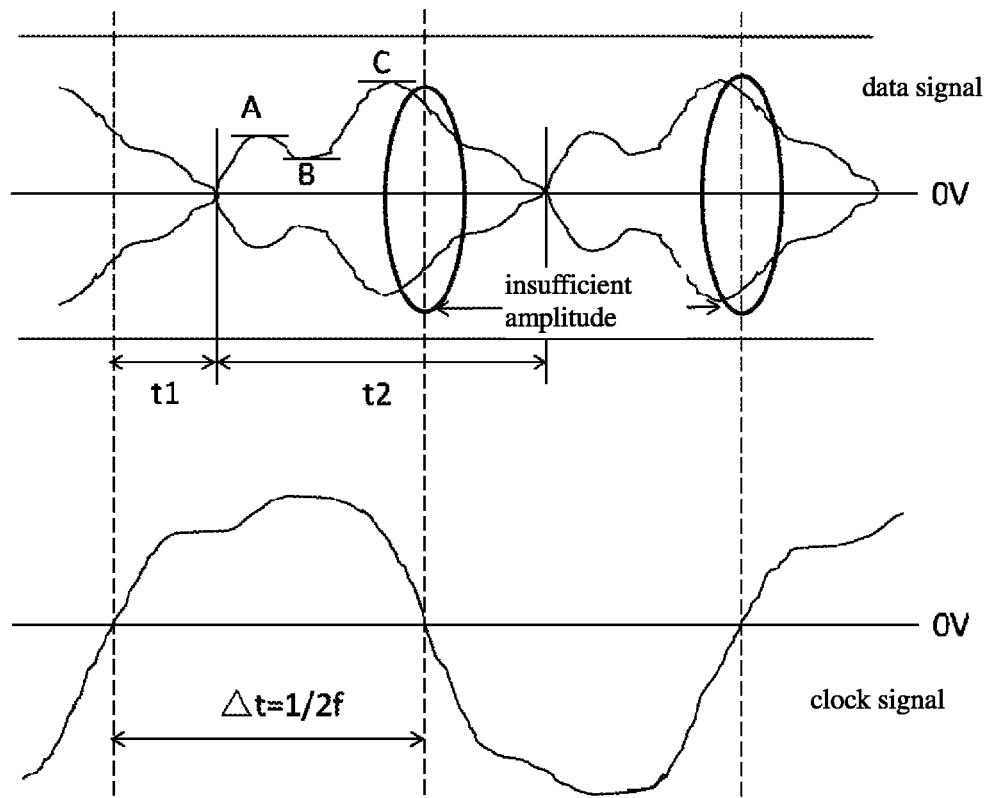
FIG. 3 is a waveform diagram of a data transmission method in an embodiment of the present application.

As shown in FIG. 3, the upper part of the figure is the waveform of the data signal, and the lower part is the waveform generated by the clock signal. Both the data signal and the clock signal are affected by the reflection, and the shape of the data signal and the clock signal both change. However, there is no correlation between the affections to the data signal and the clock signal, so the fluctuation amplitude and position of the data signal waveform and the clock signal waveform are not consistent. At this time, when the data in the data signal captured according to the clock signal, the amplitudes of the differential signal at the time point in the data signal corresponding to the rising edge and/or the falling edge of the clock signal are insufficient, which leads to data identification errors. The LCDs display abnormally when displaying according to the identified data.

In order to avoid the data identification error problem in the difference signal, this application provides a data transmission method, including: detecting a detection potential at each sampling point in a data signal in a half data period when the data signal transmission is detected. A potential judging circuit is added to the data driver and the detection potential at each sampling point can be obtained through the potential judging circuit. The logic level of the data signal in the half data period can be obtained according to the detection potential, and then, the data signal generation circuit regenerates the standard data signal according to the logic level obtained and the preset amplitude (the preset amplitude is the output amplitude of the standard data signal, its value can be obtained by experiment, usually the value is above 0.5V). The regenerated standard data signal can meet the data signal processing requirements of the internal processing circuit in the data driver, and can effectively capture data to avoid data obtaining errors.

Wherein, after the detection potential is obtained, the number of high potentials higher than the preset potential and the number of low potentials lower than or equal to the preset potential are obtained. Furthermore, when the number of high potentials is greater than the number of low potentials, it indicates that the logic level of the data signal in the detected half period is high. When the number of high potentials is less than the number of low potentials, it indicates that the logic level of the data signal in the detected half period is low. The preset potential is the critical value of signal judgment. And usually the preset potential is 0-0.3V.

Figure 4:
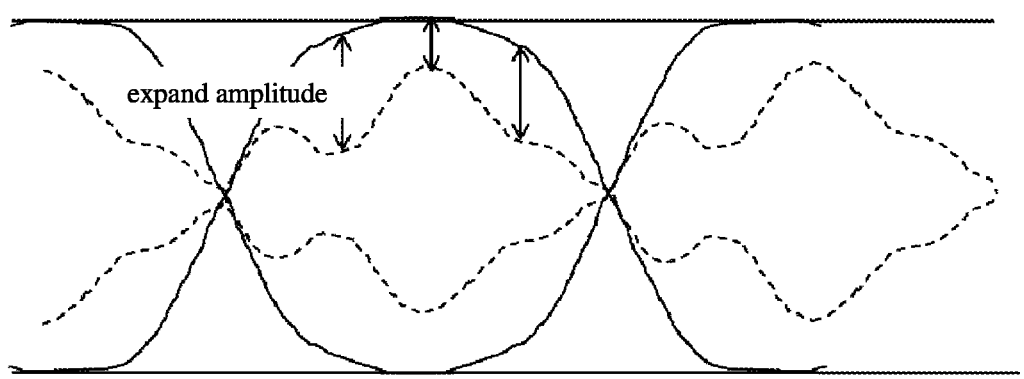
FIG. 4 is a waveform diagram of a data transmission method in another embodiment of the present application.

For example, in FIG. 3, the detection potential at three sampling points A, B and C in the half data period t2 is detected, and the preset potential is 0.3V. The detection result shows that the potentials at points A and C are higher than 0.3V, and the potential at point B is lower than 0.3V. Then, it can be judged that the potential of the data signal above the 0V line in t2 is high level. Similarly, the potential of the data signal below the 0V line is low level. Therefore, according to the determined logic level and the preset amplitude, the data waveform is regenerated and shown as the solid line drawn in FIG. 4 (the dotted line is the waveform of the initial data signal). The regenerated data signal can meet the data signal processing requirements of the internal processing circuit in the data driver, and can the data obtaining errors can be avoided.

In this embodiment, detection potential of the data signal at each sampling point in a half data period is detected when data signal transmission is detected, and logic levels of the data signal in the half data period are obtained according to the detection potentials. And then, a data signal generation circuit regenerates the standard data signal according to the logic levels obtained. The regenerated standard data signal can meet the data signal processing requirements of the internal processing circuit in the data driver, and can effectively capture data to avoid data obtaining errors.

Figure 5:
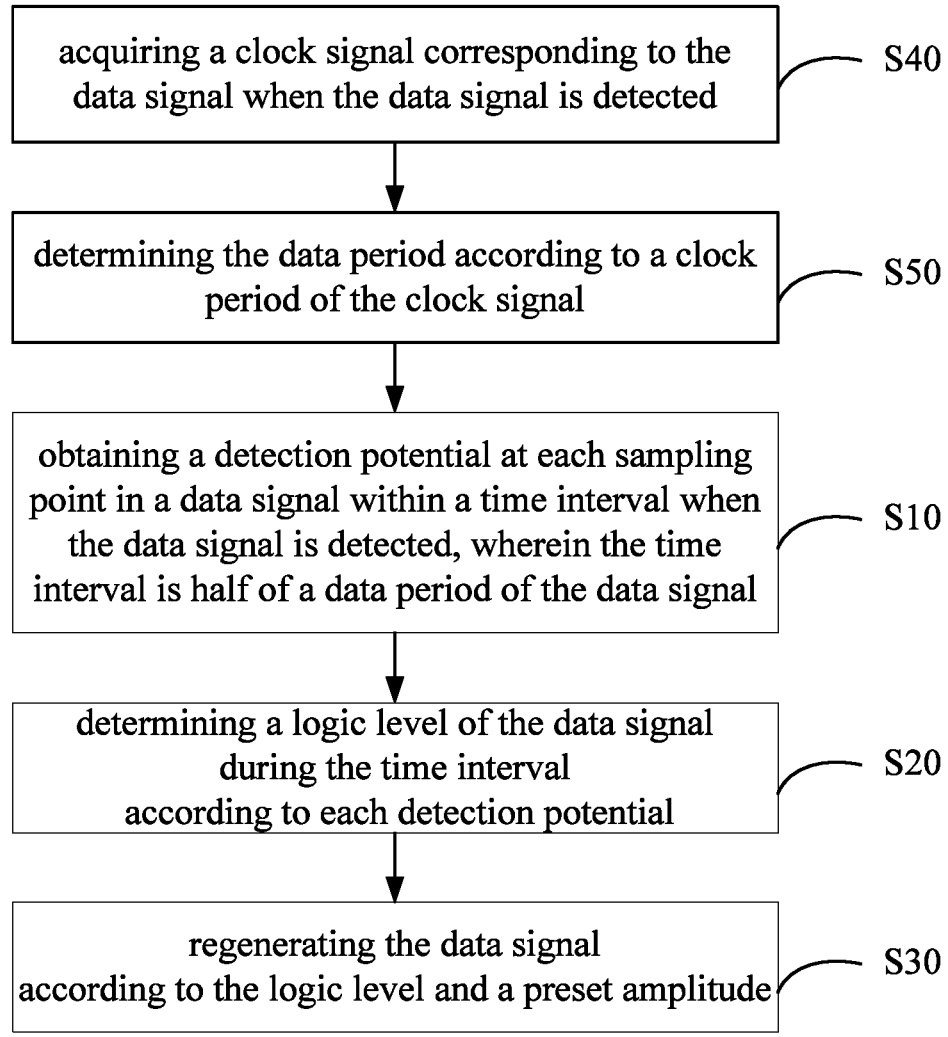
FIG. 5 is a flowchart of a data transmission method in another embodiment of the present application.

Optionally, referring to FIG. 5, in another embodiment of the data transmission method in the present application, based on the above embodiment, before the step S10, the data transmission method also includes:

step S40, acquiring a clock signal corresponding to the data signal when the data signal is detected;

Step S50, determining the data period according to a clock period of the clock signal.

When the data signal is detected, the clock signal corresponding to the data signal is acquired, and the clock period is obtained from the clock signal. Since the clock signal and the data signal are generated correspondingly, the clock period of the clock signal is equal to the data period of the data signal.

A frequency judging circuit is provided in the data driver, and the frequency of the clock signal can be obtained by the frequency judging circuit. Since the period and the frequency are reciprocal to each other, the clock period of the clock signal can be obtained according to the obtained frequency.

In addition, the zero-volt time points at which the potential of the clock signal is zero volts can be obtained through the potential judging circuit set in the data driver, and the time interval between two adjacent zero-volt time points in the clock signal is a half clock period, so the clock period can be obtained from two adjacent zero-volt time points. The clock period of the clock signal can also be obtained by other means, which will not be described here.

In this embodiment, the clock signal corresponding to the data signal is acquired when the data signal is detected to determine the detection potential in the detected data signal at each sampling point according to the clock period subsequently. The determination of the time interval provides the basis for determination of the logic level of the data signal and the regeneration of the data signal subsequently.

Figure 6:
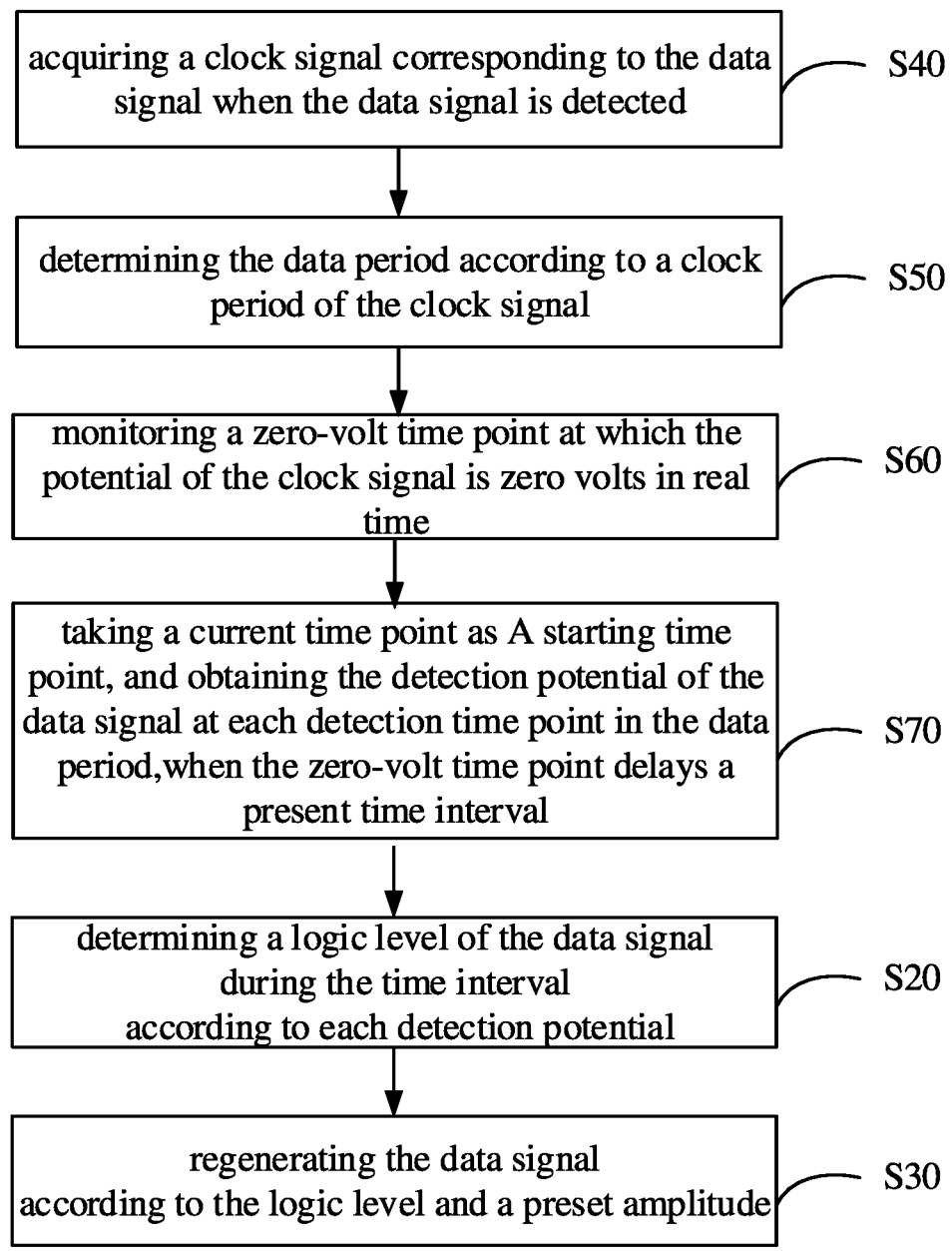
FIG. 6 is a flowchart of a data transmission method in another embodiment of the present application.

Optionally, referring to FIG. 6, in another embodiment of the data transmission method in the present application, based on the above embodiments, after the step S50, the data transmission method further includes:

step S60, monitoring a zero-volt time point at which the potential of the clock signal is zero volts in real time.

step S70, taking a current time point as a starting time point, and obtaining the detection potential of the data signal at each detection time point in the data period, when the zero-volt time point delays a preset time interval.

A potential detection circuit can be used to detect the zero-volt time point at which the clock signal is zero volts. The detection potential of the data signal at each sampling point in the time interval is began to be collected after a preset time interval of the zero-volt time points of the clock signal. A delay circuit is added to the data driver to determine the starting time point of the time interval in the data signal (namely the half data period) needed by obtaining the detection potential according to the period starting time point of the clock signal when the data signal and the clock signal unmatched, and to avoid the determination of the detection time point being mistaken, leading to obtain the time interval wrongly, the time interval for judging the logic level is not a complete half data period of the data signal, eventually resulting in regeneration of the erroneous data signal, and the data transmitting disorderly.

As shown in FIG. 3, when the zero-volt time point of the clock signal is detected, after t1 is delayed, the detection potential at each sampling point in t2 (t2=Δt) is obtained. Thereby, it is implemented that the logic level of the data signal is judged in a complete half data period of the data signal, to avoid the generation of an erroneous data signal, and the data transmitting disorderly.

In this embodiment, the potential detection circuit can be used to detect the zero-volt time point at which the clock signal is zero volts. The detection potential of the data signal at each sampling point in the time interval is began to be collected after a preset time interval of the zero-volt time points of the clock signal. A delay circuit is added to the data driver to determine the starting time point of the time interval in the data signal (namely the half data period) needed by obtaining the detection potential according to the period starting time point of the clock signal when the data signal and the clock signal unmatched, and to avoid the determination of the detection time point being mistaken, leading to obtain the time interval wrongly, the time interval for judging the logic level is not a complete half data period of the data signal, eventually resulting in regeneration of the erroneous data signal, and the data transmitting disorderly.

Figure 7:
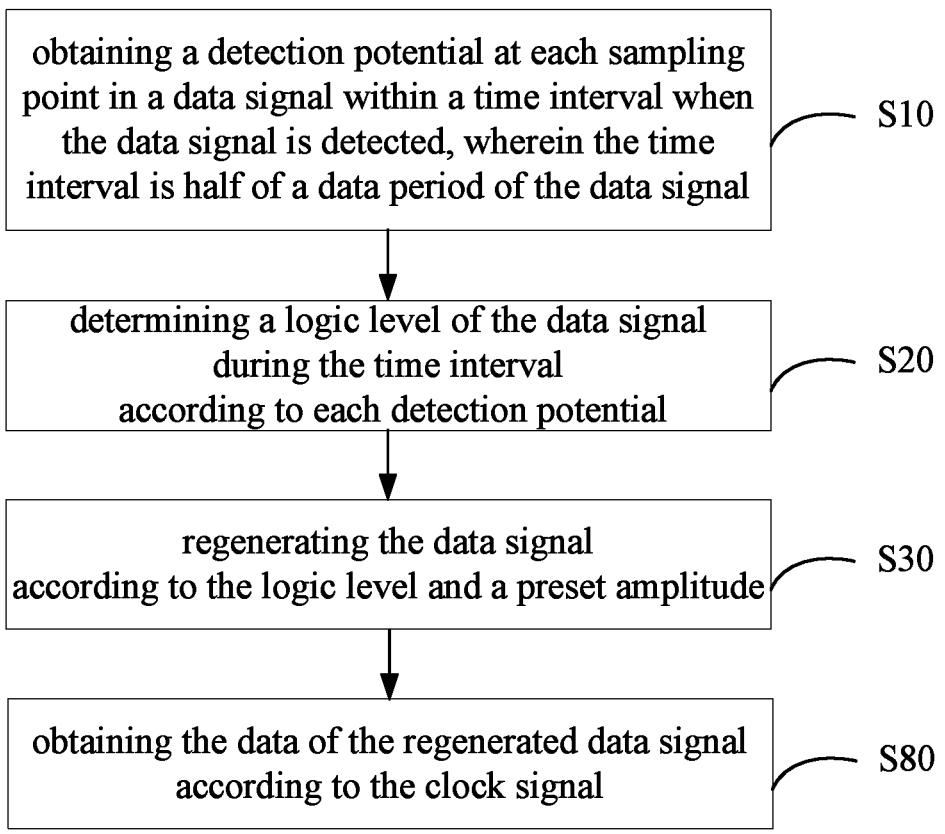
FIG. 7 is a flowchart of a data transmission method in another embodiment of the present application.

Optionally, referring to FIG. 7, in another embodiment of the data transmission method, based on any one of the above embodiments, after the step S30, the data transmission method further includes:

step S80, obtaining the data of the regenerated data signal according to the clock signal.

Although the data signal is regenerated by the data signal generation circuit in the data driver, the period and the frequency of the data signal are not changed, so that valid data in the regenerated data signal can still be captured effectively according to the clock signal. Moreover, the regenerated data signal can be processed by the internal processing circuit effectively to improve the accuracy of data capturing.

When data is captured according to the clock signal, a rising edge and/or a falling edge of the clock signal are obtained, the time point in the regenerated data signal corresponding to time point of the rising edge or the falling edge is determined, and data in the data signal is captured at the determined time point.

In this embodiment, when data is captured according to the clock signal, a rising edge and/or a falling edge of the clock signal are obtained, the time point in the regenerated data signal corresponding to time point of the rising edge or the falling edge is determined, and data in the data signal is captured at the determined time point. The regenerated data signal can be effectively processed by internal processing member to improve the accuracy of data capturing.

The embodiment of the present application also provides a data transmission device, wherein the data transmission device includes: a memory, a processor, and data transmission program stored on the memory and capable of running on the processor, the data transmission program implements following operations of the data transmission method data when executed by the processor:

when detecting a data signal, obtaining a detection potential at each sampling point in the data signal within a data period;

determining a logic level of the data signal during the data period according to each detection potential; and regenerating the data signal according to the logic level and a preset amplitude.

In addition, the embodiment of the present application also provides a computer readable storage medium, wherein the computer readable storage medium stores a data transmission program, and the data transmission program implements following operations of the data transmission method when executed by a processor:

when detecting a data signal, obtaining a detection potential at each sampling point in the data signal within a data period;

determining a logic level of the data signal during the data period according to each detection potential; and regenerating the data signal according to the logic level and a preset amplitude.

It is to be understood that the term "comprises", "comprising", or any other variants thereof is intended to encompass a non-exclusive inclusion, such that a process, method, article, or system that includes a plurality of members includes those members. It also includes other members that are not explicitly listed, or members that are inherent to such a process, method, item, or system. A member defined by the phrase "comprising a . . . " does not exclude the presence of additional equivalent members in the process, method, item, or system including the member.

The serial numbers of the embodiments of the present application are merely for the description, and do not represent the advantages and disadvantages of the embodiments.

Through the description of the above embodiments, those skilled in the art can clearly understand that the foregoing embodiment method can be implemented by means of software plus a necessary general hardware platform, and of course, can also be through hardware, but in many cases, the former is better. Implementation. Based on such understanding, the technical solution of the present application, which is essential or contributes to the prior art, may be embodied in the form of a software product stored in a storage medium (such as ROM/RAM as described above), a disk, an optical disk, including a number of instructions for causing a terminal device (which may be a mobile phone, a computer, a server, an air conditioner, or a network device, etc.) to perform the methods described in the various embodiments of the present application.

The above is only a preferred embodiment of the present application, and thus does not limit the scope of the patent application, and the equivalent structure or equivalent process transformation of the specification and the drawings of the present application, or directly or indirectly applied to other related technical fields. The same is included in the scope of patent protection of this application.

What is claimed is:

1. A data transmission method, comprising:
    obtaining a detection potential at each sampling point in a data signal within a time interval when the data signal is detected, wherein the time interval is half of a data period of the data signal;
    determining a logic level of the data signal during the time interval according to each detection potential; and
    regenerating the data signal according to the logic level and a preset amplitude;
    wherein, the operation of determining a logic level of the data signal during the time interval according to each detection potential, comprises:
    obtaining a number of high potentials higher than a preset potential and a number of low potentials lower than or equal to the preset potential in the detection potentials;
    when the number of the high potentials is greater than the number of the low potentials, determining that the logic level of the data signal is a high level during the time interval;
    when the number of the high potentials is less than the number of the low potentials, determining that the logic level of the data signal is a low level during the time interval.

2. The data transmission method according to claim 1, wherein before the operation of obtaining a detection potential at each sampling point in a data signal within a time interval, the data transmission method comprises:
    acquiring a clock signal corresponding to the data signal when the data signal is detected;
    determining the data period according to a clock period of the clock signal.

3. The data transmission method according to claim 2, wherein the operation of determining the data period according to a clock period of the clock signal, comprises:
    taking the clock period of the clock signal as the data period.

4. The data transmission method according to claim 2, wherein after the operation of determining the data period according to a clock period of the clock signal, the data transmission method comprises:
    monitoring a zero-volt time point at which a potential of the clock signal is zero volt in real time;
    taking a current time point as a starting time point, and obtaining the detection potential of the data signal at each detection time point in the data period, when the zero-volt time point delays a preset time interval.

5. The data transmission method according to claim 4, wherein a data driver for data transmission comprises a delay member, and the preset time interval is obtained through the delay member.

6. The data transmission method according to claim 4, wherein s device involved in the data transmission method comprises a potential detecting member, and the operation of monitoring a zero-volt time point at which a potential of the clock signal is zero volt in real time, comprises:
    detecting the potential of the clock signal detected by the potential detecting member in real time;
    a time point at which the potential detected is zero volt by the potential detecting member is the zero-volt time point of the clock signal.

7. The data transmission method according to claim 4, wherein before the operation of determining the data period according to a clock period of the clock signal, the data transmission method further comprises:
    obtaining a clock period of the clock signal.

8. The data transmission method according to claim 7, wherein the operation of obtaining a clock period of the clock signal, comprises:
    obtaining a frequency of the clock signal, and obtaining the clock period of the clock signal according to the frequency; or
    obtaining zero-volt time points of the clock signal, and obtaining the clock period of the clock signal according to a time interval between two adjacent zero-volt time points.

9. The data transmission method according to claim 1, wherein after the operation of regenerating the data signal according to the logic level and a preset amplitude, the data transmission method further comprises:
    obtaining data of the regenerated data signal according to the clock signal.

10. The data transmission method according to claim 9, wherein the data transmission method further comprises:
    obtaining a rising edge and a falling edge of the clock signal;
    determining a time point corresponding to the rising edge and a time point corresponding to the falling edge in the data signal; and
    capturing data corresponding to the time points in the data signal.

11. The data transmission method according to claim 1, wherein the operation of obtaining a detection potential at each sampling point in a data signal within a time interval, comprises:
    obtaining the detection potential of each sampling point detected by a potential judging member.

12. The data transmission method according to claim 1, wherein the preset amplitude is greater than or equal to 0.5 volts.

13. A data transmission device, comprising: a memory, a processor, and data transmission program stored in the memory and executable by the processor, the data transmission program implementing the following operations when executed by the processor:

obtaining a detection potential at each sampling point in a data signal within a data period when the data signal is detected;

determining a logic level of the data signal during the data period according to each detection potential; and regenerating the data signal according to the logic level and a preset amplitude;

wherein, the operation of determining a logic level of the data signal during the time interval according to each detection potential, comprises:

obtaining a number of high potentials higher than a preset potential and a number of low potentials lower than or equal to the preset potential in the detection potentials;

when the number of the high potentials is greater than the number of the low potentials, determining that the logic level of the data signal is a high level during the time interval;

when the number of the high potentials is less than the number of the low potentials, determining that the logic level of the data signal is a low level during the time interval.

14. A non-transitory computer readable storage medium, wherein the non-transitory computer readable storage medium stores a data transmission program, and the data transmission program implements the following operations when executed by a processor:

obtaining a detection potential at each sampling point in a data signal within a data period when the data signal is detected;

determining a logic level of the data signal during the data period according to each detection potential; and regenerating the data signal according to the logic level and a preset amplitude;

wherein, the operation of determining a logic level of the data signal during the time interval according to each detection potential, comprises:

obtaining a number of high potentials higher than a preset potential and a number of low potentials lower than or equal to the preset potential in the detection potentials;

when the number of the high potentials is greater than the number of the low potentials, determining that the logic level of the data signal is a high level during the time interval;

when the number of the high potentials is less than the number of the low potentials, determining that the logic level of the data signal is a low level during the time interval.

\* \* \* \* \*